United States Patent [19]
Fisher et al.

[11] Patent Number: 5,528,596
[45] Date of Patent: *Jun. 18, 1996

[54] TELECOMMUNICATIONS SYSTEMS

[75] Inventors: David A. Fisher, Saffron Walden; Paul D. Welton, Essex; Benjamin Ginsburg, Ilford, all of Great Britain

[73] Assignee: Northern Telecom Limited, Montreal, Canada

[*] Notice: The term of this patent subsequent to Nov. 23, 2013 has been disclaimed.

[21] Appl. No.: 152,278

[22] Filed: Nov. 12, 1993

[30]    Foreign Application Priority Data

Nov. 12, 1992 [GB] United Kingdom .................... 9223740
Jun. 22, 1993 [GB] United Kingdom .................... 9312911

[51] Int. Cl.$^6$ .................................................. H04B 7/212
[52] U.S. Cl. ..................... 370/95.3; 370/103; 375/206; 375/258; 359/118
[58] Field of Search ............................... 370/17, 18, 95.3, 370/103, 105.1; 359/115, 118, 120, 121; 375/1, 58, 96, 109, 115, 200, 206, 208, 285, 343, 358, 367

[56]                 References Cited

U.S. PATENT DOCUMENTS

| | | | |
|---|---|---|---|
| 4,653,049 | 3/1987 | Shinmyo ................................ | 370/95.3 |
| 4,748,621 | 5/1988 | Ballance et al. ....................... | 370/95.3 |
| 5,086,470 | 2/1992 | Ballance ................................. | 370/95.3 |
| 5,267,264 | 11/1993 | Shleuker et al. ......................... | 375/96 |

FOREIGN PATENT DOCUMENTS

0190771  8/1986  European Pat. Off. .

*Primary Examiner*—Benedict V. Safourek
*Attorney, Agent, or Firm*—Lee, Mann, Smith, McWilliams, Sweeny & Ohlson

[57]              ABSTRACT

A method for marshalling an additional outstation (3) of a time division multiple access (TDMA) telecommunications system including a basestation (4) and a plurality of outstations (1, 2), such as a passive optical network (PON). A sequence is transmitted from the additional outstation (3) to the basestation (4) at a level below the noise sensitivity of a receiver (49) of the basestation (4), detected at the basestation and its phase discrimated. From the discriminated phase the loop delay to the additional outstation is determined and the outstation instructed to realign its transmission accordingly. The sequence and its phases are detected by a correlation process. (FIG. 1).

8 Claims, 7 Drawing Sheets

| W | S | TIME | D | SIGMA |
|---|---|---|---|---|
| -27 | 8E6 | 2.3SECS | 3192 | 1414 |
| -27 | 16E6 | 4.6SECS | 6385 | 2000 |
| -27 | 32E6 | 9.2SECS | 12769 | 2824 |
| -26.2 | 8E6 | 2.3SECS | 3838 | 1414 |
| -23.2 | 8E6 | 2.3SECS | 7658 | 1414 |
| -23 | 1E6 | 0.28SECS | 1000 | 500 |

Fig. 9.

POLYNOMIAL $P(x) = 1 \oplus x^{-5} \oplus x^{-9}$

Fig.10.

TELECOMMUNICATIONS SYSTEMS

This invention relates to telecommunications systems and in particular to systems employing the time division multiplex/time division multiple access (TDM/TDMA) principle.

BACKGROUND OF THE INVENTION

The TDM/TDMA principle is well known in radio systems or passive optical networks (PONs), where it is employed to permit transmission between a single basestation and a plurality of outstations. In the downstream (basestation to outstation) direction, the information (traffic) is broadcast to all outstations, but upstream it is transmitted in bursts, each of which must be timed to avoid mutual interference (overlap) so that at any time the basestation only receives data from one outstation. When a new outstation is to be connected its time of transmission must be such that it does not interfere with existing traffic transmissions and the processing required to ensure this is referred to as marshalling.

A known method of marshalling involves reservation of a period of no transmission in the upstream frame (a window). It will be appreciated that the basestation broadcasts information to all outstations employing a frame, which is typically of length 125 microseconds. The outstations are all able to receive the downstream traffic at a different time, depending on their distance from the basestation and the propagation delay.

Typically, in the steady state, several outstations may be already configured to send their data burst to the basestation at a time which will ensure their arrival in separate bursts. A new outstation will, according to the known marshalling method, make a trial transmission into the window. The position of this is subsequently detected at the base station and used to determine the marshalling delay. In this known approach, the window in the upstream traffic flow must be at least as large as the uncertainty in the downstream and upstream loop delay. For example, with a PON, the loop delay may be 200 microseconds for a 20 Km range (i.e. the outstations may be up to 20 Km from the basestation), requiring a 200 microsecond window, which would result in an equivalent additional delay in the upstream traffic, the need for all operating outstations to queue for one window's duration traffic and necessitates subsequent storage facilities, and a loss of bandwidth given by the product of the frequency of the window and its size in bits.

It is an object of the present invention to provide an alternative marshalling process which overcomes the disadvantages of the known method.

SUMMARY OF THE INVENTION

According to one aspect of the present invention there is provided a method for marshalling an additional outstation at a time division multiple access (TDMA) telecommunications system including a basestation and a plurality of outstations, the method including the steps of transmitting from the additional outstation a sequence at a level below the noise sensitivity of a receiver of the basestation, detecting said sequence at the basestation, discriminating the phase of the detected sequence, and using the discriminated phase to determine the loop delay to the additional outstation, characterised in that the sequence and its phase are detected by a correlation process, and that the additional outstation transmits the sequence in response to instructions transmitted by the basestation for any additional outstation to so transmit, which instructions include a frame word from which frame boundaries and a time reference are deducible by the additional outstation.

The sequence and its phase can be detected by a correlation process.

Other features provided by the invention comprise phase discrimination relative to frame boundaries; use of an upstream traffic free window in which to operate a correlation/phase discriminator; a correlator design comprising an analogue to digital converter or a comparator to which noise dominated marshalling sequence signals received from an outstation are applied, a multiplier whereby the received signals are multiplied by a reference correlation sequence and a summer/up down counter to which the multiplier output is applied. The sequence can be generated at the outstation by means of reset scramblers or the retransmission of the received scrambler sequence as transmitted from the basestation free running scrambler.

The method has advantages over the prior art in that it provides the means to handle the attachment of several outstations while requiring only a small allocation of bandwidth and consequential delay.

BRIEF DESCRIPTION OF THE DRAWINGS

Embodiments of the invention will now be described with reference to the accompanying drawings, in which.

DESCRIPTION OF PREFERRED EMBODIMENT

The present invention is described hereinafter with reference to a PON network, it should be understood that the marshalling principle involved is, however, equally applicable to a radio network or to a twisted pair or coaxial cable network operating on TDMA principles.

In the method and means which form the basis of this application, the marshalling of a new outstation is achieved by the transmission of a low level data sequence which is sent at a level which is below that which degrades the ability of the basestation detector to correctly receive the traffic being received from outstations in the steady state. The signal to noise ratio required by a detector for a bit error ratio less than $10^{-9}$ is approximately 11 dB (optical), consequently, an outstation to be marshalled must transmit at a level such that the incident power of that marshalling signal at the basestation receiver is at least 11 dB lower than the weakest expected steady outstation.

Figure 1:
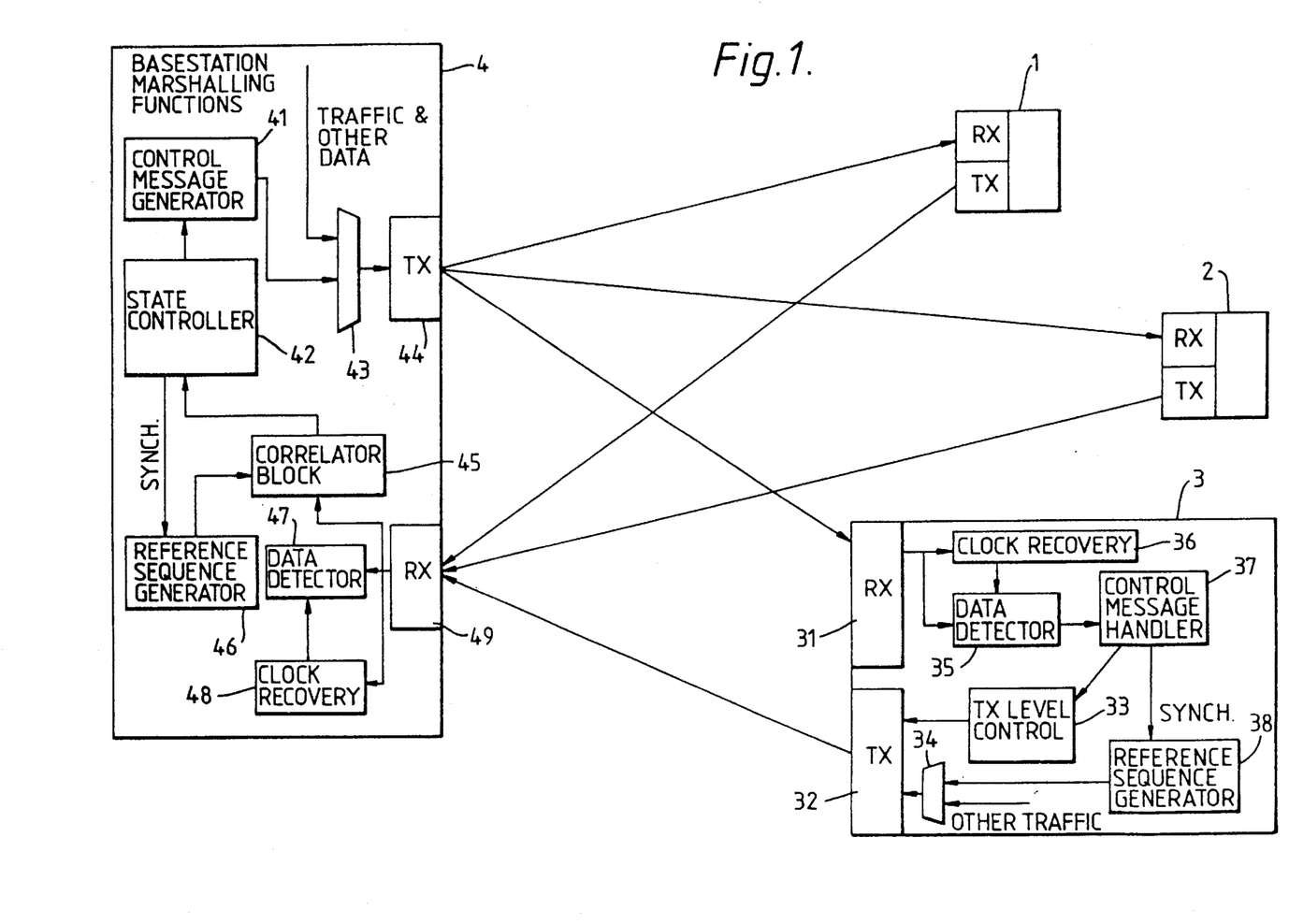
FIG. 1 illustrates a PON network to which the present invention is applicable.
Figure 2A:
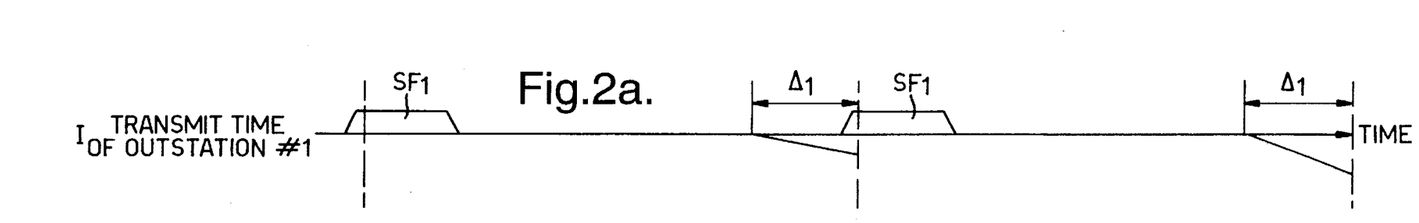
FIGS. 2a–2d illustrate the relative frame positions and required subframe transmission times from the three outstations.
Figure 2B:
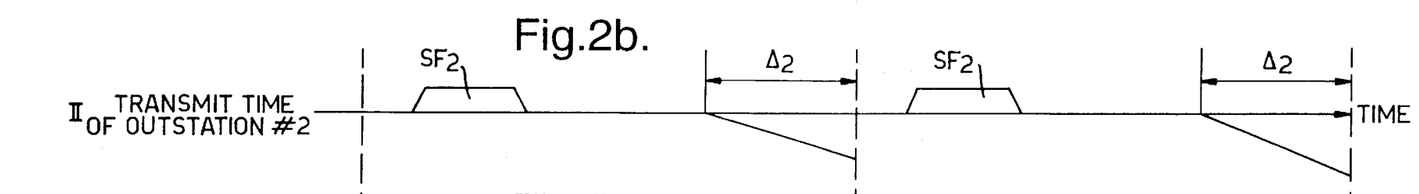
Figure 2C:
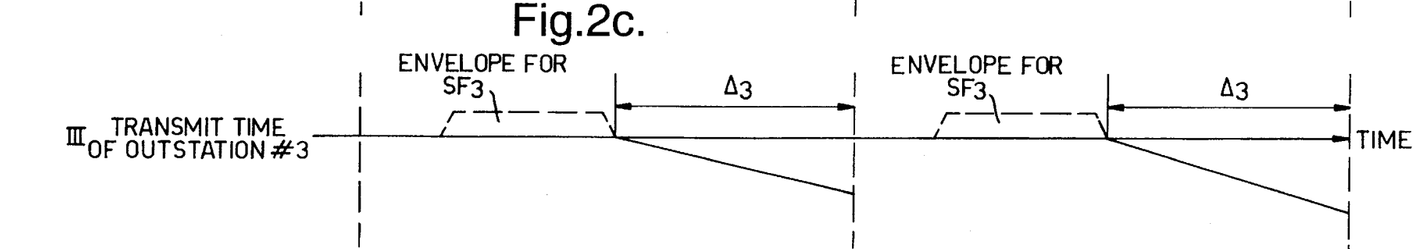
Figure 2D:
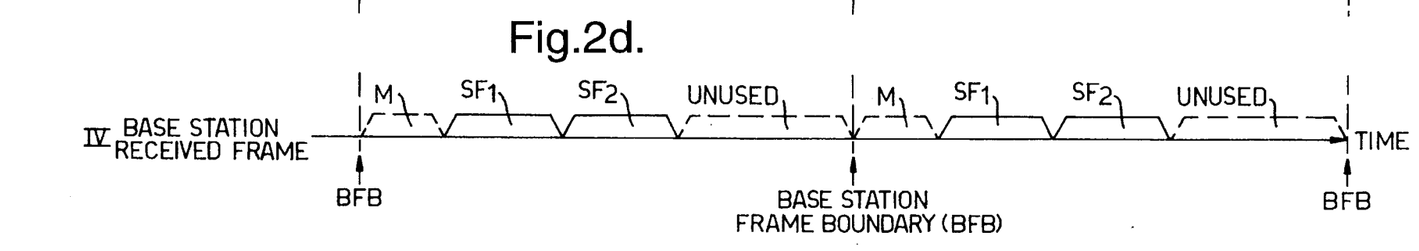

The main blocks of the basestation associated with marshalling function are shown in FIG. 1 within box 4. A timing diagram showing the transmission from the two outstations in respective transmission windows and an unused portion of the frame is given in FIG. 2. In FIG. 2, the lower line IV illustrates the basestation received frame. This consists of a marshalling window of M bits, a sub frame received from outstation 1, a subframe received from outstation 2, and an unused portion of the frame. The delay from outstation 1 to the basestation 4 results in the time at which the outstation subframe bursts $SF_1$, is transmitted being as illustrated, likewise for outstation 2 and burst $SF_2$. Subframe burst $SF_3$ from an additional outstation 3 which is to be marshalled must be transmitted so that it is received within the unused portion of the frame and must therefore be within the time envelope indicated on the third line of the timing diagram III, the purpose of the marshalling method being to determine the delay.

The operation of system is as follows:

The outstation 3 requiring to be marshalled, will receive downstream data from the basestation 4. This data will include a recognisable frame word, from which frame boundaries can be deduced. For reasons for simplicity, the downstream frame format will be similar to the upstream format as illustrated in FIG. 2, line IV, except that the downstream marshalling window is not needed, and may be used instead to convey control messages to the outstations to control the marshalling process originated in the control message generator 41 as a result of the state controller 42 and being routed via the multiplexer 43 to the transmitter 44 for broadcasting to each outstation.

Outstation 3 is therefore able to be controlled in its actions from the basestation and has a time reference comprising the cyclically occurring frame boundary, which may be supplemented by a superframe identifier also transmitted downstream consisting, for example, of a 16 bit word incremented in each frame as a message.

Figure 3:
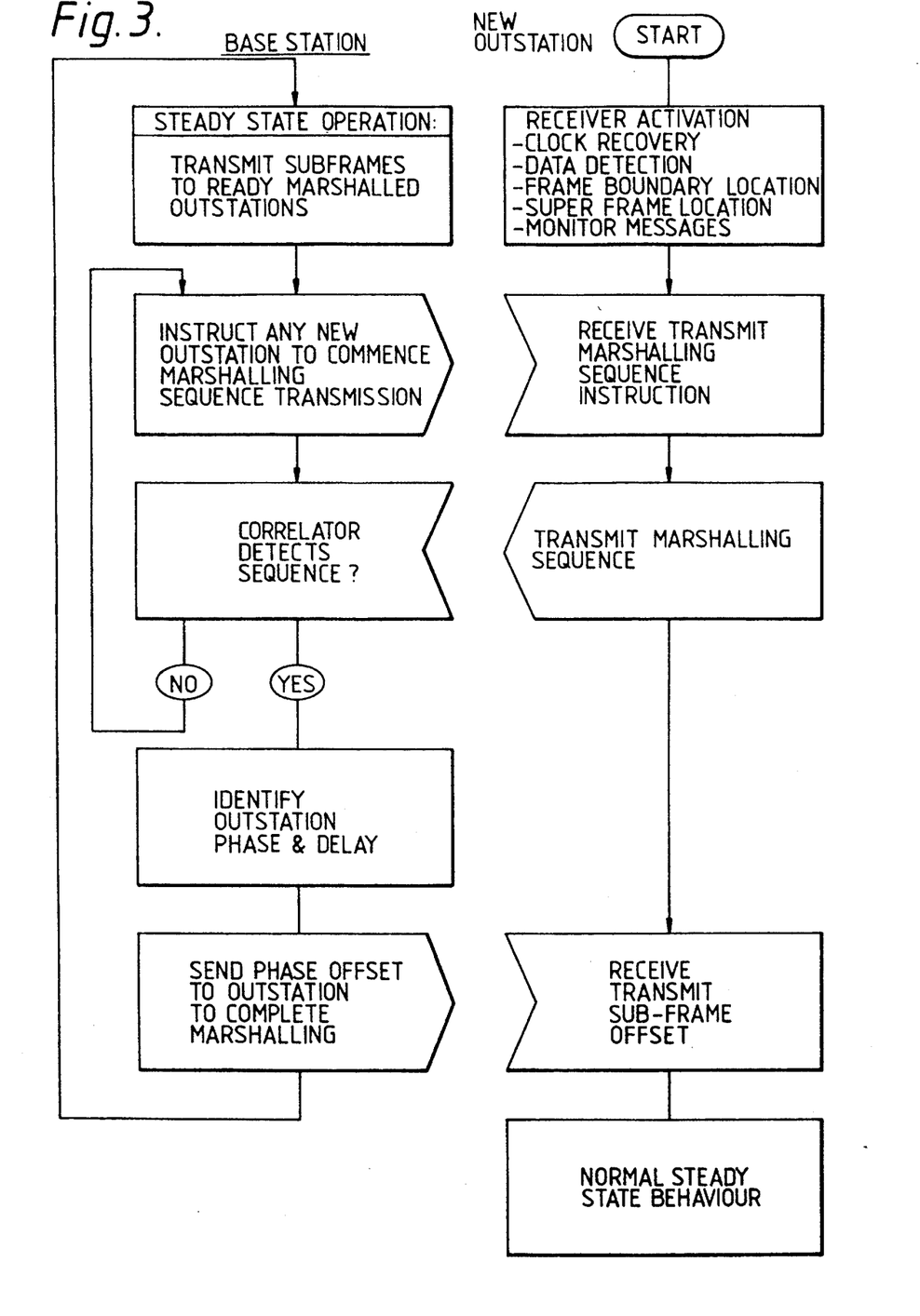
FIG. 3 illustrates the sequence of events initiated by the basestation to enable and outstation to attach.

The sequence of events which is to occur is defined in FIG. 3. The basestation does not know that an outstation is trying to attach, so it will send out an instruction for any prospective outstation to transmit its sequence. For optimum performance the transmitted sequence ($S_i$) should have the property that the autocorrelation product has a fixed and uniform value for all time shifts other than 0 (or equivalently the sequence length L).

The receiver block RX49 may consist of an optical receiver converting incident optical power into electrical signals. The correlator may be realised using analogue correlation methods or digital methods, the latter will be described.

Figure 4:
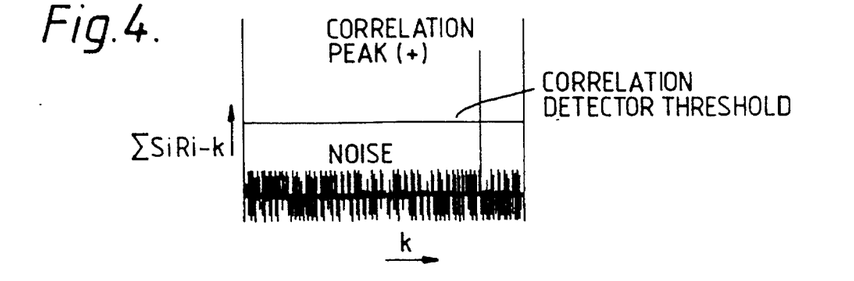
FIG. 4 illustrates the ideal autocorrelation behaviour for all phases.
Figure 5:
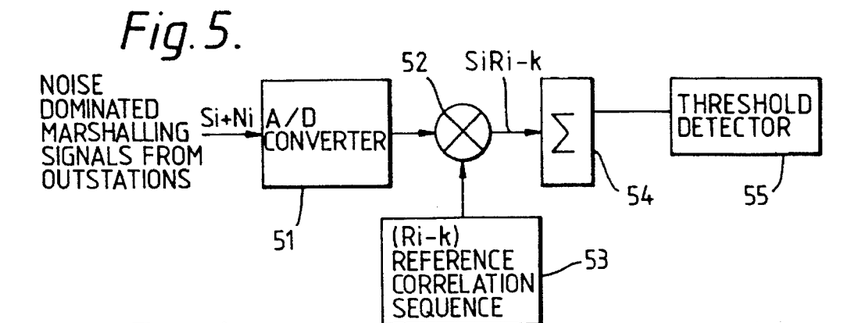
FIG. 5 illustrates the ideal correlator realisation.

The electrical signal from the RX front-end 49 may be directly converted as illustrated in FIG. 5 using an analogue to digital converted 51 and fed into the correlator, comprising the multiplier 52, reference correlation sequence source 53 and a summation circuit 54 comprising an adder and a memory (not shown). The correlator may be replicated L times so as to check all possible phases of the sequence over the same period employing different value of delay (k), or one correlator may be operated L times. The summation circuit 54 will be cumulatively incremented by the component of the signal received from the outstation that is in phase with the reference sequence whilst noise having a zero mean value will not be cumulative and hence over a sufficient number of samples, an originally dominant noise to signal ratio will result in the in phase component causing one of the L correlators to reach a predefined detection threshold. The ideal correlator behaviour is illustrated in FIG. 4, corresponding to the ideal correlator realisation of FIG. 5.

At the outstation 3 wishing to marshal, the sequence is transmitted continuously. At the basestation 4, the correlation process is operated during the marshalling window during which there is no other upstream signal i.e.

$$\sum_{i=0 \text{ to } L-1} S_i \, S_{i+k} = X_1$$

Figure 9:
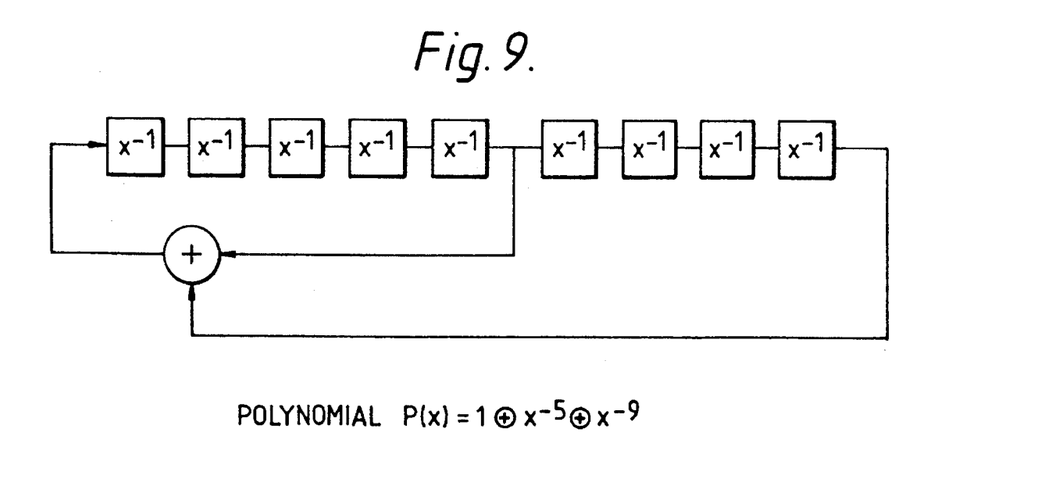
FIG. 9 illustrates the realisation of a $2^9-1$ PRBS generator pseudo random sequence generator.

This is a normal property of maximal length pseudo random sequence such as may be generated by the linear feedback shift register illustrated in FIG. 9 and expressed mathematically by the expression $$S_i = \frac{1}{1 + X^{-5} + X^9}$$

The sequence generator 38 at the outstation to be marshalled is synchronised to the same value (eg. all 1s), at the same position in the same frame as the reference sequence generator, 46 at the basestation. Consequently the outstation reference sequence generator start time (in absolute terms) is delayed compared to the basestation reference due to the downstream propagation delay. Upstream, when received it has been further delayed by the upstream propagation delay. It is the purpose of the basestation receiver 49 and correlator block 45 to determine this offset.

The DC balance in the reference sequence applied to the b basestation correlator(s) will reduce or eliminate the effects of DC offsets in the sampled signal.

Figure 6:
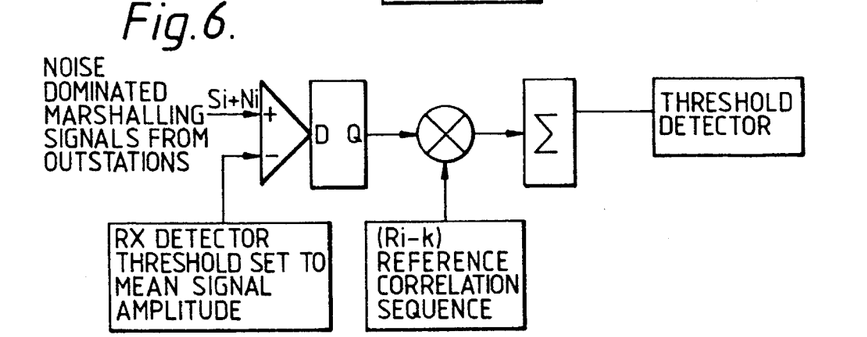
FIG. 6 illustrates the simplified correlator realisation.
Figure 7:
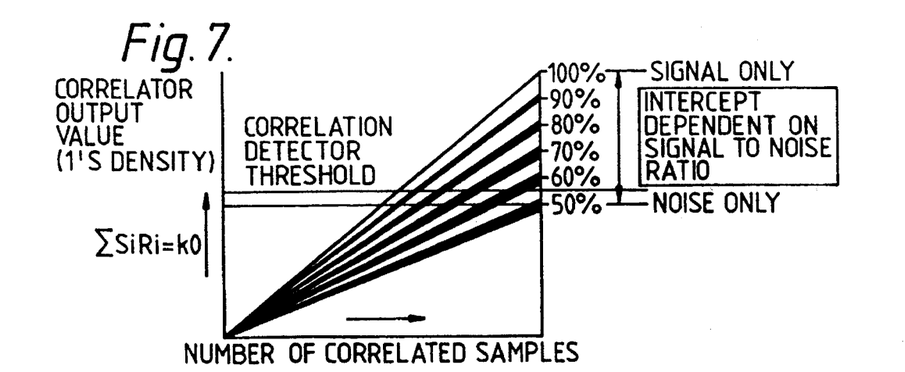
FIG. 7 illustrates the correlator behaviour (simplified)

An alternative advantageous and simplified realisation is given in FIG. 6. This is a 1 bit correlation detector whose threshold behaviour is shown in FIG. 7. A 1 bit correlation detector behaves as the ND based version but with "DC" offset due to noise dominating decisions. In this case, in place of the analogue to digital correlator, a comparator is used which may be the same comparator as used in the data detection block 47 of FIG. 1. Because the input noise dominated during the marshalling window, the comparator output will on average be 50% high and 50% low. The presence of the outstation marshalling sequence will alter the balance of ones and zeros producing a weak component of the marshalling sequence, since a noise value lying just below the one/zero threshold will be pushed over it by a weak marshalling sequence one. The output of the detector is binary (as illustrated) and consequently the correlation product will be binary and the summation circuit becomes an up/down counter. The noise variance of the correlation sum value is proportional to the number of correlated samples.

As with the full A to D solution, the correlator may be replicated L times so that one of L threshold detectors detects the presence of the outstation transmitting the marshalling sequence.

The value of the reference sequence delay (k) as applied to the particular correlator that reaches this threshold first will represent the sum of the downstream and upstream delay. This value may therefore be transmitted in a message to the outstation so that it can place its subframe correctly in the unused part of the upstream frame.

The correlator consists of a sum of products circuit and the threshold detector may consist of a register defining the threshold, fed to one input of a comparator, the other input to which is the correlator output.

Since it is the deviation from the mean number of one's that is required, an up-down counter may be substituted for the 'summer' which is incremented when the correlator product is a one, and decremented when the correlator product is a zero thus directly giving the deviation D.

The time from which the instruction to the outstation was sent to synchronise and commence transmission of the marshalling sequence to the time at which the correlator reaches the predefined threshold, can be used as a measure of the incident power of that outstation. If this time is shod, then this indicates the outstation signal path has low loss and the outstation may be instructed to transmit its subframes at a lower power level so as to reduce the dynamic range requirements of the basestation receiver.

The relationship between the noise to (marshalling) signal ratio and the derivation from 50% ones and 50% zeros sum at the correlator output is given in FIG. 7.

The sequence length in the system described needs to exceed the delay uncertainty, consequently a sequence length of several thousand bits will be required to identify uniquely the position.

A typical value for the marshalling window is 50 octets with a clock frequency of 50 Mbit/s per second corresponding to a period of approximately 5 microseconds.

Figure 8A:
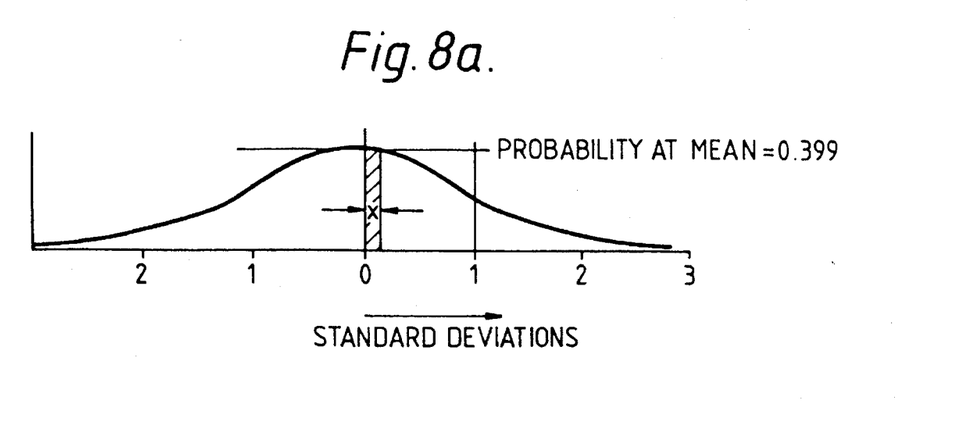
FIGS. 8a and 8b relate to an explanation of the noise to signal ratio relationship to expected threshold.
Figure 8B:
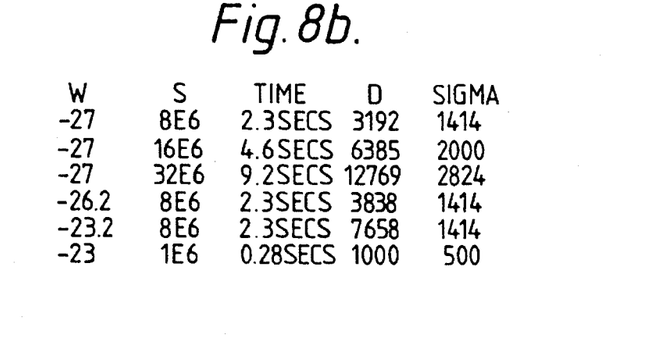

The noise to signal ratio relationship to expected threshold will now be explained with reference to FIGS. 8a and 8b. For the time when the received marshalling sequence and the reference sequence are in phase, consider a small correlation signal component of peak amplitude C (at the sampling instant) compared to the RMS noise amplitude at the sampling instant. When C is present, the probability of a one will increase by 0.4 C. (0.4 is the height at the mean of the Gaussian amplitude distribution). Since the probability of the marshalling sequence signal being a one is 50%, C increases the average probability of a one by 0.2 C at the correlation circuit output. For S samples having an optical peak signal to mean noise ratio of W (mean signal to mean noise ratio=W−3dB) the equivalent electrical peak signal to the mean noise ratio is 2W (mean signal to mean noise ratio=2W−6dB) and $$C=10^{2W/20}$$

the deviation from the noise only value (0.5S)=0.2CS=0.25× $10^{W/10}$ (after S bits processed by the correlation circuit).

With regard to the correlation noise standard deviation (sigma), for a correlator output with 50% ones and 50% zeros, the resultant summation is binomial having a mean second moment of sqrt=(np(1−p)), where p is the probability of a one and n is the same size. FIG. 8a shows the Gaussian amplitude distribution (zero mean and standard variation sigma). The probability at the mean is 0.399 (0.4 as above). A correlation signal for a one of amplitude C increases the probability of a detected one by 0.399 C (shaded). It should be noted that in a unipolar optical system when C=O there is no component transmitted. FIG. 8b is a table indicating for correlation signal to noise ratio W(dB), and for a number of samples S, the deviation D from the mean expected number of ones and the standard deviation sigma giving the expected statistical variation. The column time assumes by way of example marshalling sampling window bandwidth of (1/0.28)mbit/s. In this case, the ratio of the deviation D to sigma is a measure of the reliability of the method, this ratio increasing with S.

The basic correlation scheme illustrated in FIG. 5 includes a threshold detector. A frequent requirement of attachment mechanisms within telecommunications systems is minimisation of the elapsed time. The threshold detector referred to above compares the count value of the correlator against a fixed value. This value must be calculated so that if integration proceeds for the maximum period, then the probability that in the absence of a signal, the threshold will be exceeded due to random fluctuations in the correlator value alone will be constrained to a required minimum, C, typically 0.001. If the threshold is set in this way for the maximum integration period, then it will provide an un necessarily great degree of protection against spurious detection in the early stages of the correlation step.

A theoretically ideal threshold detector would check for a varying threshold T(n) where n is the number of bits (n bytes) correlated, defined by the following equation.

Probability $(S(n)>T(n))=C$ where C is the level of confidence required and S(n) is the correlation count in the absence of a signal. Since, in the absence of a signal each bit (or byte) is a Bernoulli Trial, then the distribution of S will be normal with standard deviation (sigma) sqrt (n)/2. This approximation is a standard mathematical technique. Therefore, where U is the standard normal deviate $P(U>T(n)/sigma)=C$ If U1 is the value such that Probability (U>U1)=C (obtained from statistical tables commonly employed by those practising the design of equipment which is probabalistic in nature).

$T(n)/sigma=U1$ $T(n)=U1*sigma$ $T(n)=U1*sqrt(n)/2$

Figure 10:
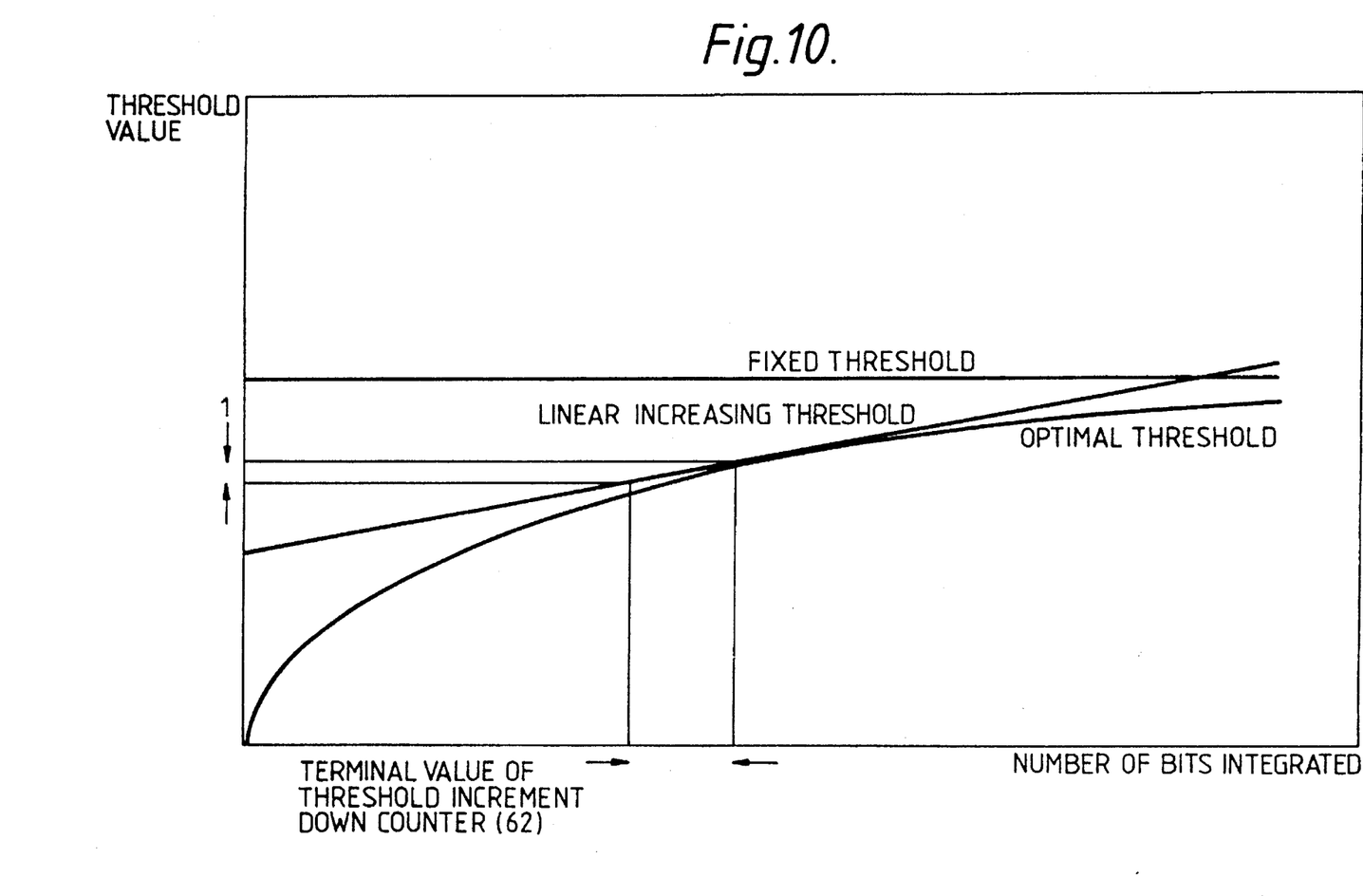
FIG. 10 is a graph of optional, linear increasing and fixed thresholds against integration period.
Figure 11:
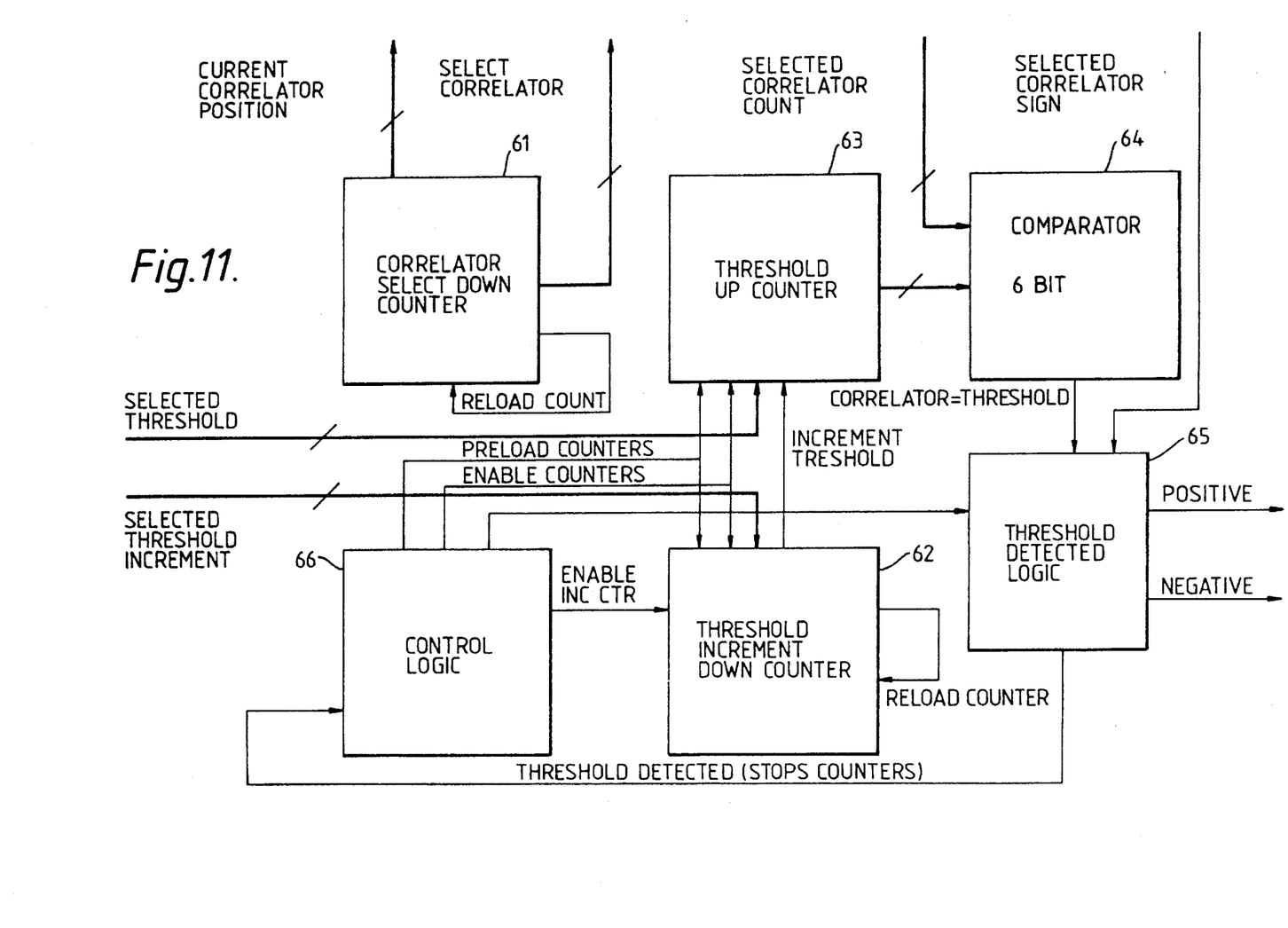
FIG. 11 illustrates a circuit to realise an incrementing threshold detector.

Whilst a threshold detector which checked the correlator value for equivalence to the varying quantity T(n) would offer optimal performance in terms of both the speed with which the result might be obtained and the confidence in the result obtained, a threshold detector would typically be realised in digital hardware so as to approximate this function while effecting economies in design. One such approximation T1(n) would be a linear approximation as illustrated in FIG. 10 which is a graph of optimal, linear increasing and fixed thresholds against integration period. A circuit to realise such a linearly increasing threshold is illustrated in FIG. 11.

The circuit comprises a number of counters which are standard binary up or down counters. When one of these counters reaches its terminal value (0 for a down counter, maximum value for an up counter) then it automatically reloads (0 for a down counter, maximum value for an up counter). One such counter 61, the correlator select down counter, is a continuously running up counter which selects each correlator in turn and has a maximum value of the number of correlators employed. While correlation is in progress, the threshold increment down counter 62 counts the number of bits or bytes correlated until the period between "threshold increments" is reached. When this occurs the threshold up counter 63 is incremented. The value of this is compared with the correlator count by a comparator 64. The block threshold detected logic 65 determines whether the correlator has reached a positive or negative threshold. The process is controlled by control logic 66.

We claim:

1. A method for marshalling an additional outstation of a time division multiple access (TDMA) telecommunications system including a basestation and a plurality of outstations, the method including the steps of transmitting from the base station instructions for any additional outstation to transmit, transmitting from the additional outstation a sequence at a level below the noise sensitivity of a receiver of the basestation, detecting said sequence at the base station, discriminating the phase of the detected sequence and using the discriminated phase to determine the loop delay to the additional outstation, wherein the sequence and its phase are detected by a correlation process and wherein the instructions transmitted by the basestation include a frame word from which frame boundaries and a time reference are deducible by the additional outstation.

2. A method as claimed in claim 1, wherein the correlation process is performed at the basestation and comprises comparing the detected sequence with an identical sequence produced by a generator at the basestation in a correlator, and wherein following determination of the loop delay to the additional outstation whereby to align its transmission in a respective transmission window.

3. A method as claimed in claim 2, wherein the system incorporates a passive optical network (PON), wherein the basestation receiver is an optical receiver converting incident optical power into an electrical signal and wherein the electrical signal is directly converted in an analogue to digital converter prior to application to the correlator, which comprises a multiplier and a summation circuit/up-down counter followed by a threshold detector.

4. A method as claimed in claim 3, wherein the same correlator is used for each position of the sequence, different delay values being applied thereto.

5. A method as claimed in claim 3, wherein a respective correlator is used for each position of the sequence, each having a respective delay value.

6. A method as claimed in claim 2, wherein at the additional outstation the sequence is transmitted continuously whereas at the basestation the correlation process takes place during a marshalling window.

7. A method as claimed in claim 3, wherein the detection threshold is increased with time to approximately normalise the ratio of deviation due to the correlation sequence and the statistical deviation due to noise so as to reduce the detection time for a given correlation signal strength.

8. A method as claimed in claim 1, wherein the sequence is a maximal length pseudo random sequence.

\* \* \* \* \*